US006631497B1

(12) United States Patent
Jamshidi et al.

(10) Patent No.: US 6,631,497 B1
(45) Date of Patent: Oct. 7, 2003

(54) BINDING DATA FROM DATA SOURCE TO CELLS IN A SPREADSHEET

(75) Inventors: Ardeshir Jamshidi, San Jose, CA (US); Farzad Farahod, El Cerrito, CA (US); Hardeep Singh, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 09/356,606

(22) Filed: Jul. 19, 1999

(51) Int. Cl.⁷ .............................................. G06F 17/21
(52) U.S. Cl. ...................................... 715/514; 715/503
(58) Field of Search ............................. 707/501, 503, 707/504, 514, 101, 102

(56) References Cited

U.S. PATENT DOCUMENTS

| | | | | |
|---|---|---|---|---|
| 5,657,460 A | * | 8/1997 | Egan et al. ................. | 345/326 |
| 5,734,889 A | | 3/1998 | Yamaguchi .................. | 395/604 |
| 5,752,253 A | * | 5/1998 | Geymond et al. .......... | 707/503 |
| 5,819,293 A | | 10/1998 | Comer et al. ................ | 707/203 |
| 5,842,018 A | * | 11/1998 | Atkinson et al. ........... | 707/501 |
| 5,883,623 A | | 3/1999 | Cseri ........................... | 345/335 |
| 5,893,123 A | | 4/1999 | Tuinenga ..................... | 707/504 |
| 5,897,649 A | * | 4/1999 | Kennedy ..................... | 707/538 |
| 5,953,716 A | * | 9/1999 | Madnick et al. ................ | 707/4 |
| 5,970,476 A | * | 10/1999 | Fahey .......................... | 705/28 |
| 6,002,865 A | * | 12/1999 | Thomsen ........................ | 707/3 |
| 6,275,866 B1 | * | 8/2001 | Boulia et al. ................ | 709/315 |
| 6,292,811 B1 | * | 9/2001 | Clancey et al. ............. | 707/503 |

* cited by examiner

*Primary Examiner*—Stephen S. Hong
(74) *Attorney, Agent, or Firm*—Michael J. Buchenhorner; Romualdas Strimaitis

(57) ABSTRACT

A method including importing data objects from different data sources to define a data source model, associating each data object with one or more cells in a spreadsheet, and binding data from the data objects to the one or more cells upon request. The binding is based on information from the data source.

21 Claims, 8 Drawing Sheets

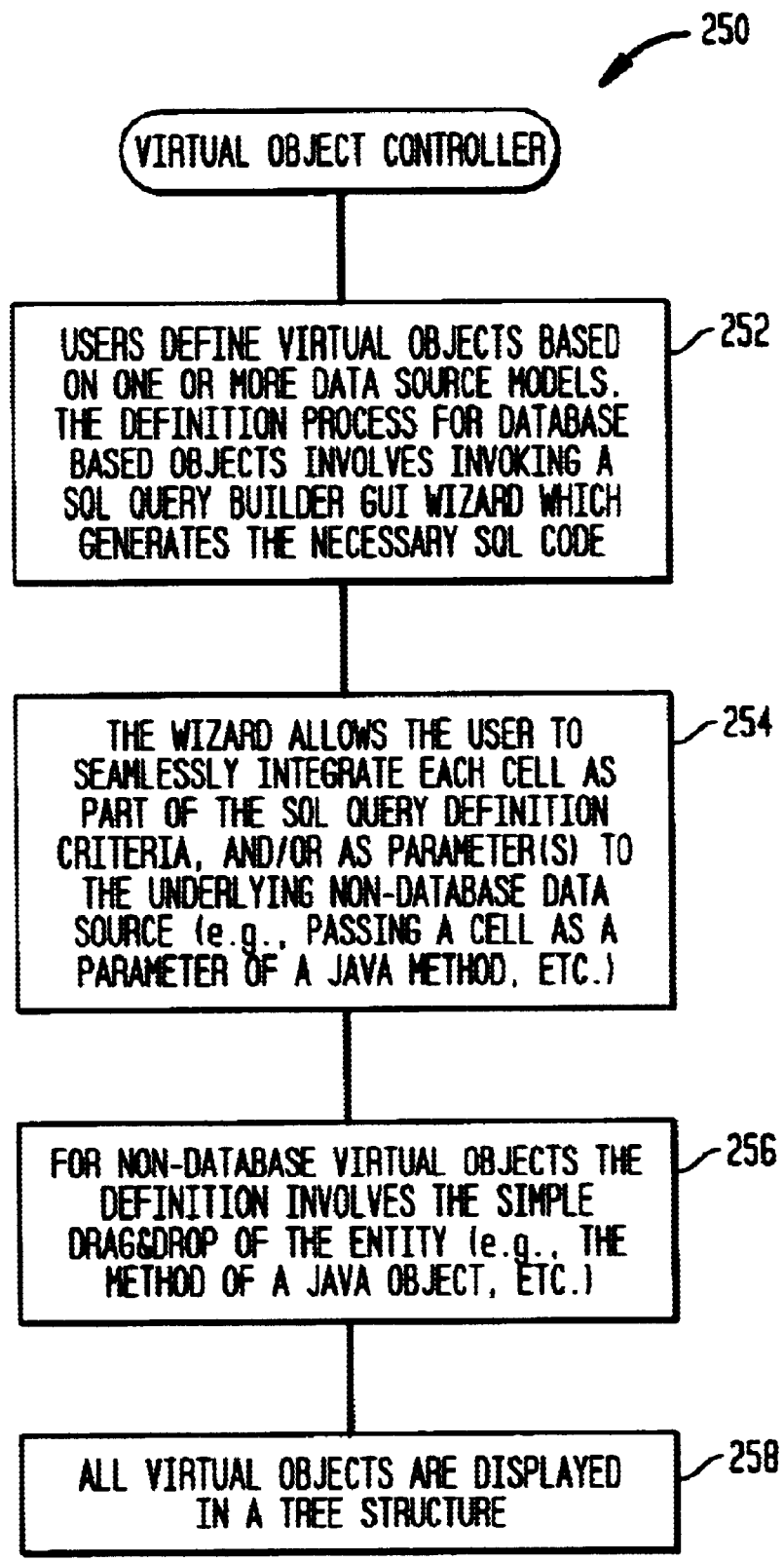

BINDING DATA FROM DATA SOURCE TO CELLS IN A SPREADSHEET

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Spreadsheet programs are commonly used for mathematical and database applications such as record-keeping, "what-if" and optimization analysis, calculations, charting and graphical analysis. Electronic spreadsheets offer many advantages over their paper counterparts. For one, electronic spreadsheets allow users to manipulate more information than their paper counterparts.

Also, spreadsheet programs allow users to.perform "what if" scenarios so that, after a set of mathematical relationships has been entered into a worksheet, the spreadsheet can be recalculated using different sets of assumptions, with the results of each recalculation appearing dynamically. Performing this operation manually, with paper and pencil, would require recalculating every relationship in the model with each change made. Thus, electronic spreadsheets offer dramatic improvements in ease of creating, editing, and using mathematical models over traditional financial modeling tools such as the accountant's columnar pad, pencil, and calculator.

Although electronic spreadsheets are capable of manipulating vast amounts of data, there is no convenient system for placing data in the spreadsheets. Spreadsheets have cells containing specific sets of rules and instructions defined by the end user for the manipulation and presentation of data. While defining such sets of rules and instructions for each cell is an easy task, the task of directing and transferring distributed data to each cell can be quite complex.

A conventional way of doing this imports a set of desired data from a database into the spreadsheet by reading a file of the database that is stored with the data and importing it to the spreadsheet. Another conventional method includes a step of retrieving necessary data from a database to input the data into a table. For this retrieval, a programmed retrieval formula is required for the database. The former conventional method, in which a file of database is directly read, requires that the constitution of the database be understood, as well as the format of the file stored with data, and the like. The format of any table to be read is thus restricted by the storing format of the database, constituting a difficulty in a selective reading of data.

In most cases, the format of the data to be extracted from a database does not have a sufficient adaptability to the table format of an employed spreadsheet, thus requiring the user to re-form the table format of read data into an adaptive one. The latter method, in which a retrieval formula is input for database retrieval, also needs the constitution of the database to be understood, in addition to the necessary preparation of a retrieval formula by the user, who is thus required to master both how to write the formula for database retrieval and how to use a given spreadsheet.

Typically, to bind a relational database management system (RDBMS) data source to a particular cell in a spreadsheet, specific macros and coding need to be done. Writing the macros and code requires a user to have knowledge of programming in Visual Basic, Excel objects methods and properties, and Structured Query Language (SQL). Additionally, the code has to be adjusted or revamped every time the database is updated or business logic evolves. Furthermore this code is specific to one particular spreadsheet application.

In sum, a user must be familiar with details of the constitution of the database to effectively utilize data therefrom on a spreadsheet. Such a requirement puts a large burden on the user to make an effective use of the database on a spreadsheet, thus constituting a hindrance to using the spreadsheet to analyze the content of the database.

SUMMARY

The invention binds data from a data source to one or more cells in a spreadsheet by importing a data object and defining a data source model for the data object; associating the data object with the one or more cells in the spreadsheet; and binding data from the data object to the one or more cells upon request.

Implementations of the invention include one more of the following. The importing and associating steps are performed during design time, and the binding step is performed during run time. The imported data is stored in an Extended Markup Language (XML) format. The imported object is stored in a tree. The associating step includes dragging-and-dropping one or more children of the data object into one or more cells in the spreadsheet. The data source can be a database, in which case SQL code is generated during run-time. If the data source is a business object, a method or a function associated with the data source can be invoked.

Advantages of the invention include one or more of the following. The invention provides a "seamless" two-way link between the spreadsheet and an external data source such as a RDBMS, so that the two appear to be fully integrated. In such a seamless integration, the transfer of data to and from the external data source would appear to be completely automatic, occurring in the normal course of the spreadsheet's recalculation. The invention provides a user-friendly interface with a drag-and-drop paradigm that provides the spreadsheet end user with the ability to view the entire distributed environment. Users can then simply drag-and-drop their desired distributed data source(s) to each cell of the spreadsheet. The invention thus seamlessly propagates and reflects the changes made to each cell to underlying binding data source(s) in a platform independent manner.

Moreover, distributed (or otherwise) data source(s) in a computing environment can be viewed. Such data sources can be defined or modeled into one or more data source schema(s) by simple dragging-and-dropping of entities representing data source(s). This requires no programming or technical knowledge of such concepts as SQL, or other data-source (including database) technologies on behalf of the spreadsheet user. Thus, the invention encapsulates and hides the coding and programming that would otherwise be required for the spreadsheet cell-data source binding to take place.

Other features and advantages will become apparent from the following description, including the drawings and the claims.

BRIEF DESCRIPTION OF DRAWINGS

FIG. 2B is a flowchart of a process associated with a virtual object controller.

DETAILED DESCRIPTION OF THE INVENTION

Figure 1:
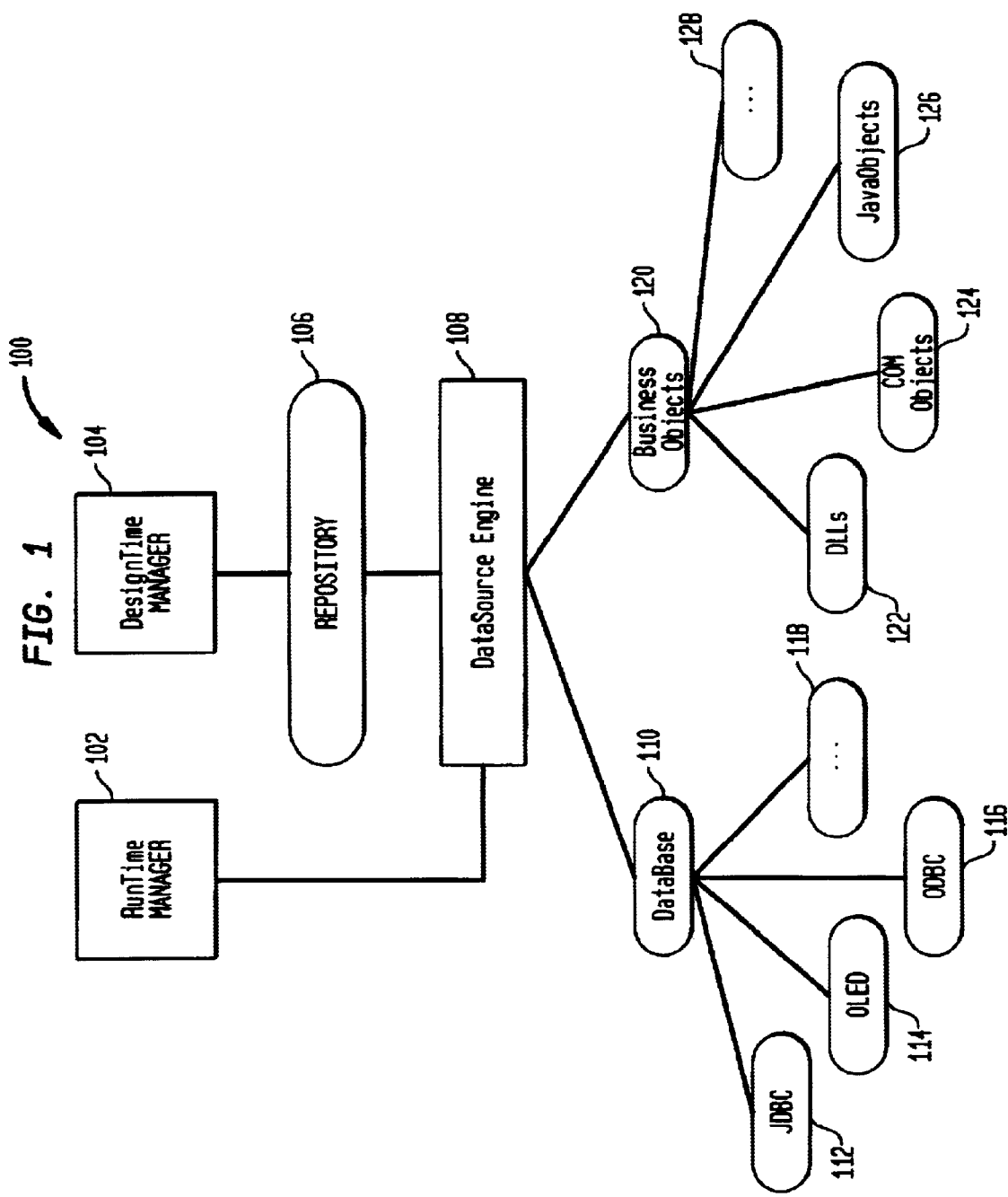
FIG. 1 is a diagram illustrating a system for automatically binding a cell in a spreadsheet with one or more data sources.

FIG. 1 shows a system 100 for providing automatic spreadsheet cell-data source binding. The system includes a run-time manager 102 and a design-time manager 104. The design-time manager 104 communicates with a repository 106, which in turn communicates with a data source engine 108. The data source engine 108 communicates with various database sources 110 as well as non-database sources of data, including business objects 120. The database sources 110 can be JDBC 112, OLED 114, or ODBC 116, for example. Further, the data sources are not simply database objects but can be non-database objects such as DLLs 122, COM objects 124, Java objects 126, and executables, among others. The data source engine 108 also communicates with the run-time manager 102 to provide the cell-data source binding upon user request.

The design-time manager 104 has a data modeler, which is a user-friendly graphical user interface (GUI) control that exposes all existing data sources (RDBMS or otherwise) in a distributed (or otherwise) computing environment. For example, RDBMS data sources include databases and all objects that are encapsulated by the database. These include tables, columns within each table, and stored procedures, among others. Examples of non-RDBMS data source include a DLL or a Java package, among others. All objects that are encapsulated by such data sources are also exposed to the users. These can include public methods, functions, parameters, etc. Users can then examine each object and set certain properties of such objects. Furthermore users can create new schema(s) and include different objects from different data sources into such schema(s) by a simple drag-and-drop user interface. The modeler handles the creation of all such schema(s). During design-time, a user can drag-and-drop specific data source(s) as displayed in the modeler to individual cells of the spreadsheet. A binding manager in the design-time manager 104 then handles all binding processes, regardless of the type of data source selected.

In the system of FIG. 1, data sources in the distributed computing environment are viewed using a model viewer component. The user then creates a model and imports certain data sources from the distributed environment into the model. This is done by a simple drag-and-drop operation of selecting the desired data sources and then dragging them into the model. The system of FIG. 1 will note the read/write attribute of each data source imported. This will be used later to provide a bi-directional capability of transmitting data between the cell and the data source.

The user then creates one or more views to the model. Views are referred to as virtual objects. These views are created using a virtual object controller (see FIG. 2B). The user can then simply drag and drop elements of a data source to create the views to the corresponding model. Furthermore, a user can define the parameter(s) of each element of, a view via a special GUI wizard. Thus, for example, the value passed to a particular parameter of a Java method is defined by stating the name of the cell, or by a formula that is based on some values. In this manner, data sources can be mixed into one model and each data source can bind to an individual cell. The mixing of data sources into one model and making the distinction at bind time provides modeling capability in addition to the binding capability.

The user then binds the elements of a model view to individual cells on the spreadsheet using a link manager (see FIG. 2C), which displays all models and their respective views in a tree structure control. The binding is done by a simple drag-and-drop operation, including dragging an element of a view (e.g. a column, or a Java method) and dropping it on a specific individual cell on an Excel worksheet.

The run-time manager 102 will then oversee the transformation, conversion and transition of data from and to a data source to its binding cell, and vice versa. Operations performed by the run-time manager 102 include: opening a connection from the data source to the cell (and vice versa), constructing and executing specific SQL statements (if the underlying binding data source is RDBMS), or invoking specific methods and functions (if the underlying binding data source is non-RDBMS such as a DLL or a Java package, etc.); and conversion, transformation and transition of data between each cell and its underlying binding data source.

All metadata information with regard to binding is serialized within the worksheet as an Extensible Markup Language (XML) object. XML is a subset of the ISO Standard Generalized Markup Language (SGML), which is a standard document formatting language that enables a publisher to create a single document source that can be viewed, displayed, or printed in a variety of ways. SGML is a large, complex formatting language that is not especially suited to the Web. HTML and XML are simplified versions of SGML that are specifically designed to support Web pages. XML is very similar to HTML (and is in fact interoperable with HTML), but it does not rely on a single DTD. Instead, XML provides a standard mechanism for any document builder to define new XML tags within any XML document. In addition to being a markup language, XML is a meta-language that can define new DTDs. An XML DTD specifies the format for a particular XML document type, identifying what tags could or should appear within the document. A document can contain or point to its DTD; therefore, XML is a self-describing data format. An XML document does not need to be defined by a DTD. But if a DTD does exist, it is used to validate that a document matches a specific format. Any XML parser can dynamically parse the embedded DTD to learn how to parse the XML tags within the document and to validate the contents of the document.

In the system of FIG. 1, the runtime environment seamlessly reads all such metadata information and according the binding instructions transfers data between the cell and the underlying bound data source. Such instructions include SQL code that need to be executed (if the underlying bound data source is a database object), or the location of the method, and function that needs to be executed (if the underlying bound data source is a non-database object). Thus, the system of FIG. 1 models the data source information and the document template into an XML format and then binds them together inside the spreadsheet. At runtime this meta data is used to locate the data source over the network, to fetch and update data into and from the spreadsheet.

Figure 2A:
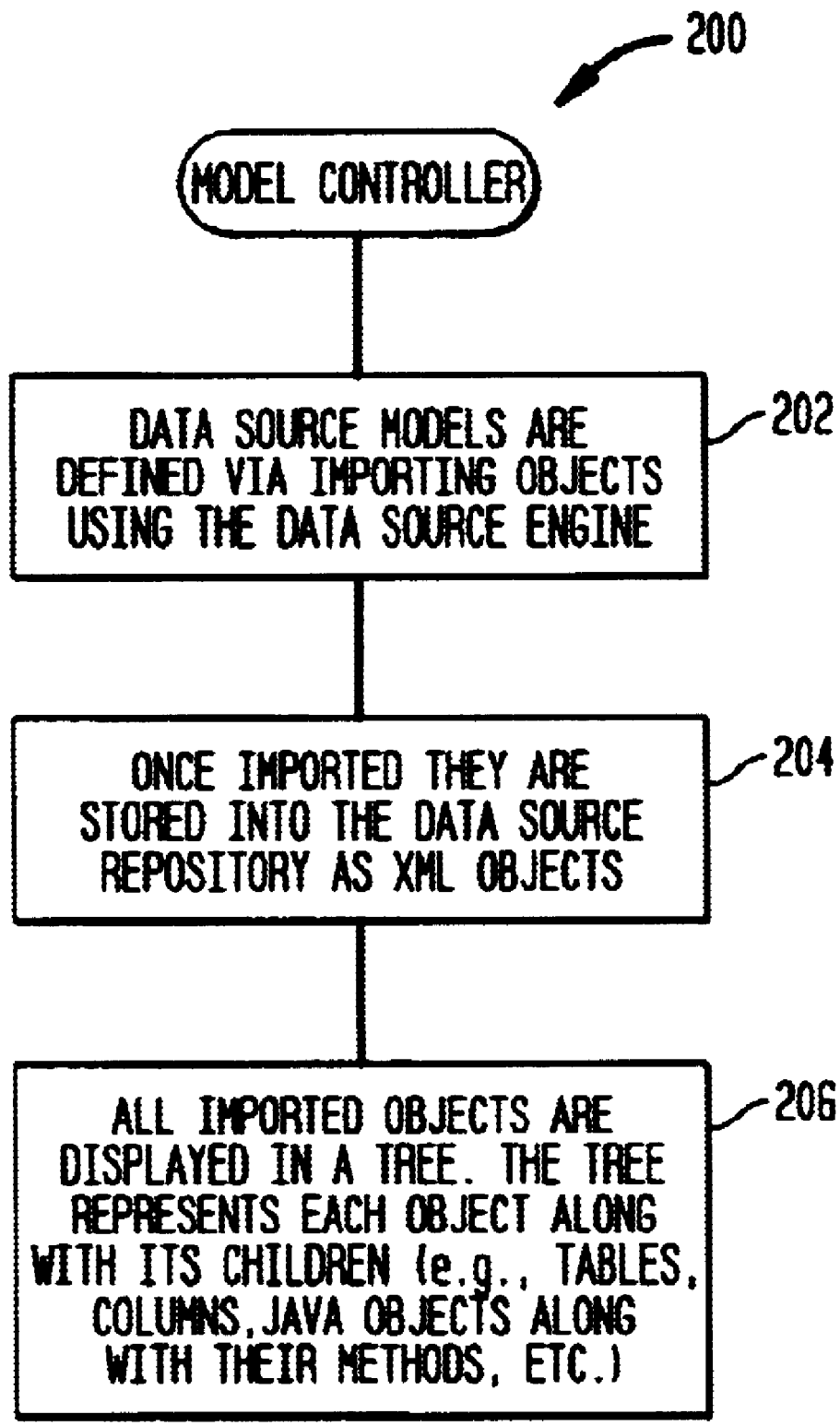
FIG. 2A is a flowchart of a process associated with a model controller.
Figure 2C:
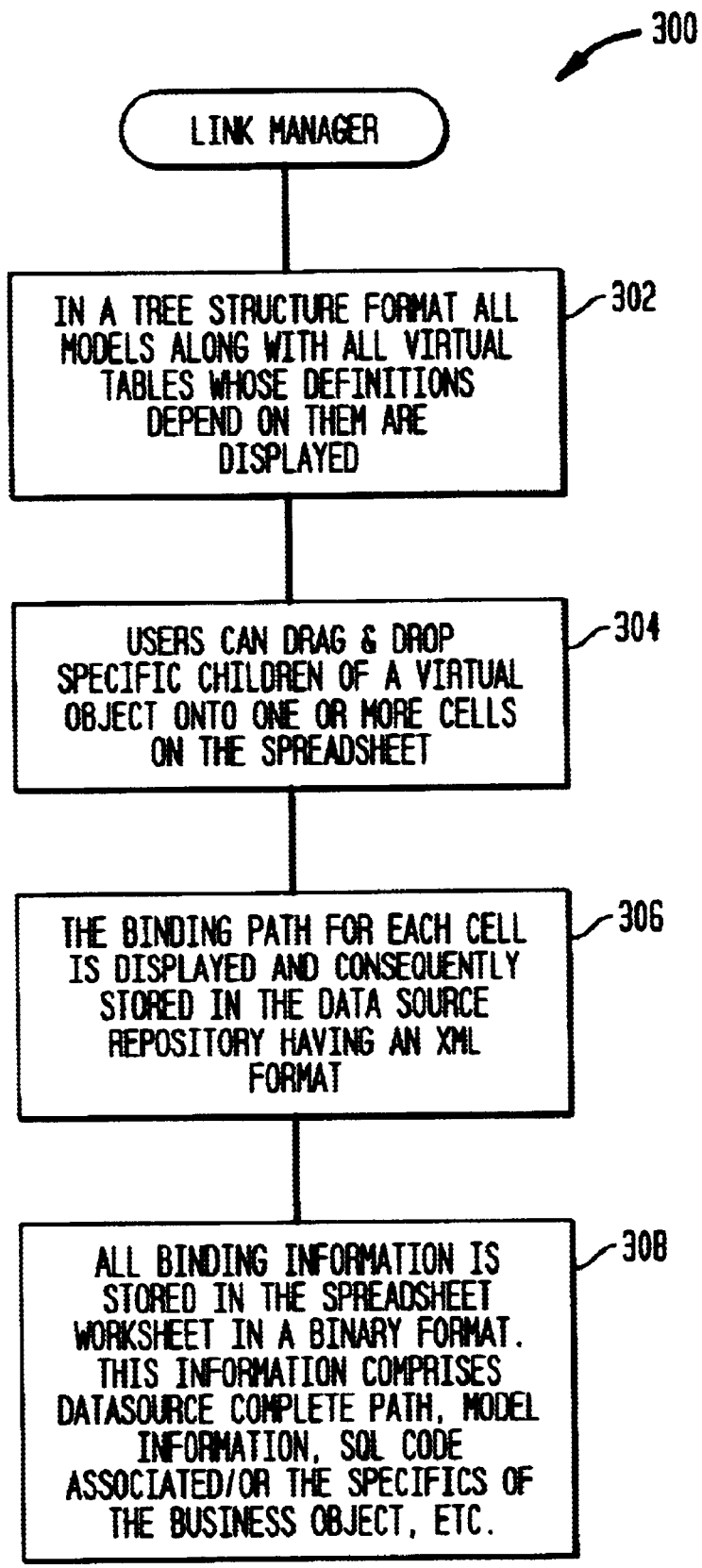
FIG. 2C is a flowchart of a process associated with a link manager.
Figure 3:
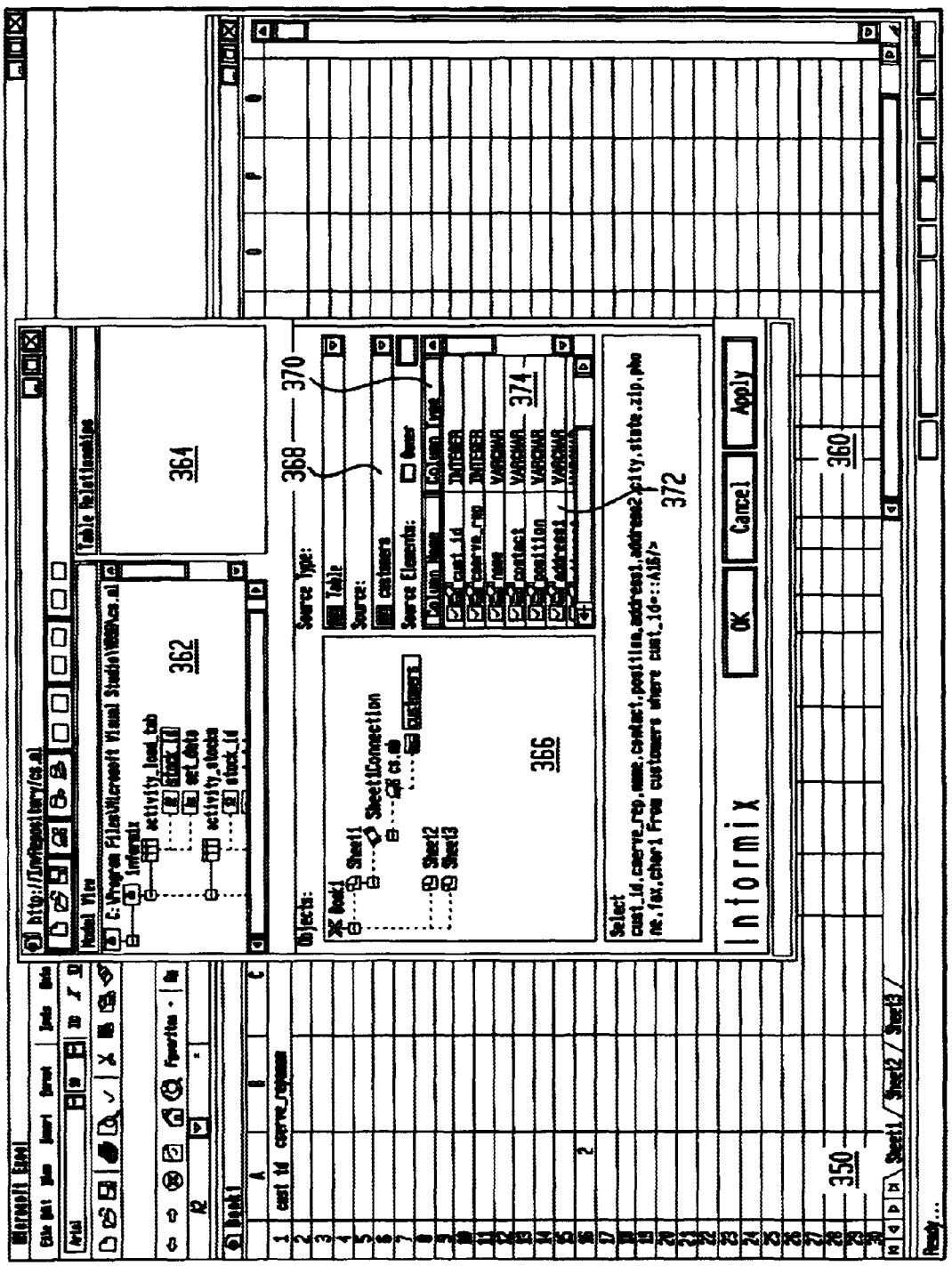
FIG. 3 is an exemplary user interface for the model controller and the virtual object controller.
Figure 4:
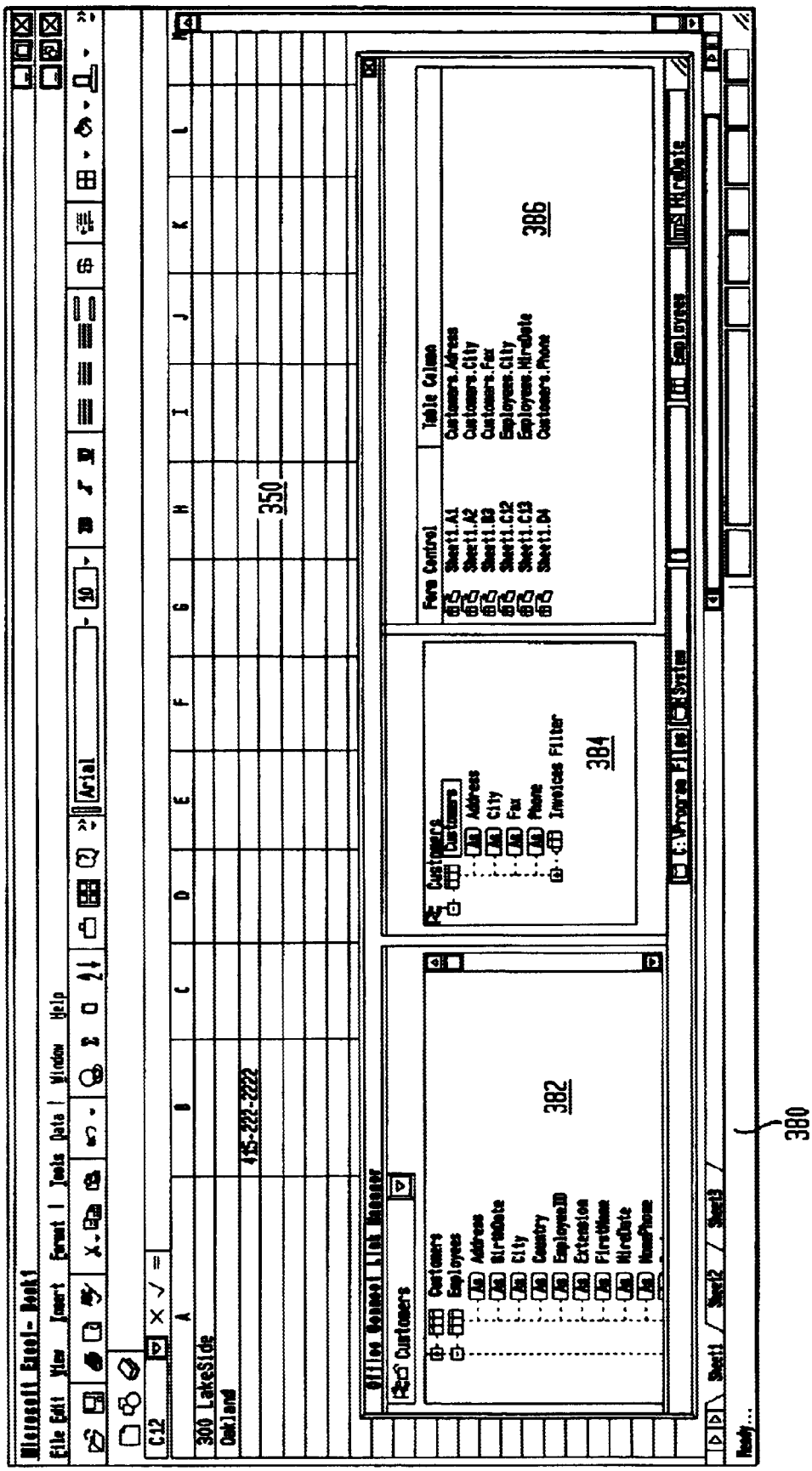
FIG. 4 is an exemplary user interface for the link manager.

FIGS. 2A, 2B and 2C show processes 200, 250 and 300 associated with a model controller, a virtual object controller, and a link manager, respectively. The controllers are part of one GUI control that has been divided into three windows or panels, embodiments of which are shown in FIGS. 3 and 4 and discussed below. The model controller allows the user to create a model and import data sources to that model. Once imported, the model is displayed in a tree with the top level node being the name of the model. The virtual object controller allows users to drag and drop individual elements of a model from the model controller into a view. Again, everything is displayed in a tree with the top level model being the name of the view that the user creates.

The link manager allows models and all their associated views to be displayed in a tree structure with the top level being the model with its child nodes being the views. As a view to a particular model is created in the middle window, a node is added to the link manager tree accordingly under the model. Users can select, and drag and drop an element of a view from the Link Manager tree into an individual cell on the spread sheet. As this is done, the link path gets displayed on the right panel side of the link manager window. The link path is the full path describing the name of worksheet.cell.datasource path to which the data source being dragged and dropped is bound.

Shown in FIG. 2A is the model controller which is used for importing data sources into a user defined model. This component stores all necessary meta data information such as the URL location and path of each data source, their read/write attributes, and parameters.

In process 200, meta data information regarding parameter definition, origin and location of all elements brought into a particular view are stored as XML. The term parameter here refers not only to the parameters of methods and functions but also to the arguments appearing in the WHERE clause part of a SQL statement defining a particular view that may contain database related objects. For example, a user may bring in column 1 from table t1, and column 2 from table t2 into the view. The SQL that will be generated will select t1.c1, t2.c2 from t1,t2 where t1.c1=<whatever>, t2.c2=<whatever>. The <whatever> portions are noted by a GUI wizard (that is part of this component), and the user can enter them in the wizard. The <whatever> clause can be arbitrarily defined-as actual values or as a complicated formula or even the name of a particular cell in the worksheet (e.g. select t1.c1, t2.c2 from t1,t2 where t1.c1=cell1= 75 and t2.c2=cell2*cell1+45). The SQL statements are automatically generated, and a user friendly wizard assists the user to define the WHERE clauses of the generated SQL statement, thus freeing the user from having to know SQL in depth.

Data source models are defined by importing objects using the data source engine 108 (step 202). As discussed earlier, the data sources are not simply database objects but can be non-database objects such as Java objects, COM objects, DLLs, and executables. Next, the models are stored in the data source repository 106 as XML objects (step 204). Finally, the imported objects are displayed in a tree (step 206). The tree stores information on each object, along with the object's children. Thus, data stored by the tree can include tables, columns, and Java objects and their associated methods, among others.

To illustrate, an exemplary model can have eleven data sources. They may include three tables, and two stored procedures imported from a database, two Java objects each having three methods, and a DLL having four functions. User can drag and drop two of the columns from one table, 3 columns from another table, 2 of the methods from the first Java object, and a method from the second Java object, and one function from the DLL into a view.

FIG. 2B shows a process 250 associated with a virtual object controller. The virtual object controller allows the user to define one or more views into a specific data source model. The process 250 involves defining a specific view name and then dragging-and-dropping individual elements of a model (e.g. table columns, Java methods, COM methods, stored procedures, functions, among others) into that view. First, in step 252, the user defines various virtual objects based on the data source models defined in step 202 of FIG. 2A. For database objects, step 254 includes invoking a SQL query builder wizard which generates the SQL code. The wizard allows the user to seamlessly integrate each cell as part of the SQL query definitional criteria. Alternatively, if the data source is not a database, the wizard takes into consideration parameter(s) of the underlying non-database data source (step 256). For non-database virtual objects, the definition of each virtual object involves the drag-and-drop of the object into the cell. For instance, the parameter may include the method of a Java object. Finally, the virtual objects are stored and displayed in a tree structure (step 258).

Referring now to FIG. 2C, a process 300 associated with a link manager is shown. The link manager displays all models along with all the views that are defined for that model in a tree structure control (step 302). Users can then drag and drop an element of a view to a particular cell on the worksheet. The system in turn stores the necessary meta data information with a worksheet of the spreadsheet. The meta data information includes the necessary SQL statement for passing the data between the cell and the underlying data source (if it is a database object), or the location and the parameters that need to be set in order to invoke a method or function if the underlying data source is non-database information. The wizard responsible for handling the parameter assignment can also be invoked at this stage as well in order to overwrite the default parameter value as defined by the virtual object controller.

FIGS. 3 and 4 show exemplary user interfaces for the model controller, the virtual object controller, and the link manager discussed above. These controllers are seamlessly integrated with an exemplary spreadsheet, which in this case is Microsoft Corp.'s Excel spreadsheet. The controllers are coded in Visual Basic Application and are embedded within Excel.

Turning first to FIG. 3, a spreadsheet 350 is shown. Documents in the spreadsheet can be viewed as having two main components: a template and data that populates such templates. Document templates simply provide the manner in which data is to be manipulated and subsequently presented to an end user. Data is an entity that originates from one or more network based distributed (or otherwise) sources. In the spreadsheet, each cell is viewed as an independent GUI control object tied to one or more data source object(s). Each such cell will maintain its own specific behavior as defined by its contained characteristics as defined by the spreadsheet user. Because each cell is viewed and manipulated as a GUI control, a collection of such cells will establish an independent entity capable of navigating through one or more distributed data source(s).

The system presents one GUI control that has been divided into three windows or panels, embodiments of which are shown in FIGS. 3 and 4. The model controller allows the user to create a model and import data sources to that model in a model view 362. Table relationships associated with the imported data sources are shown in the table view 364. Once imported, the model is displayed in a tree with the top level node being the name of the model. The virtual object controller allows users to drag and drop individual elements of a model from the model controller into an object view 366. Again, everything is displayed in a tree with the top level model being the name the view user creates. In the example of FIG. 3, meta data associated with the source object is shown. As the source object is a database, the meta data includes a source 368, a column name 372 and a column type 374.

FIG. 4 shows an exemplary link manager user interface. The link manager allows models and all their associated views to be displayed in a tree structure 382 with the top level being the model with its child nodes being the views. As a view to a particular model is created in the middle window 384, a node is added to the link manager tree accordingly under the model. Users can select, and drag and drop an element of a view from the link manager tree into an individual cell on the spread sheet. As this is done, the link path gets displayed on the window 386 of the link manager window. The link path is the full path describing the name of worksheet.cell.datasource path to which the data source being dragged and dropped is bound.

Figure 5:
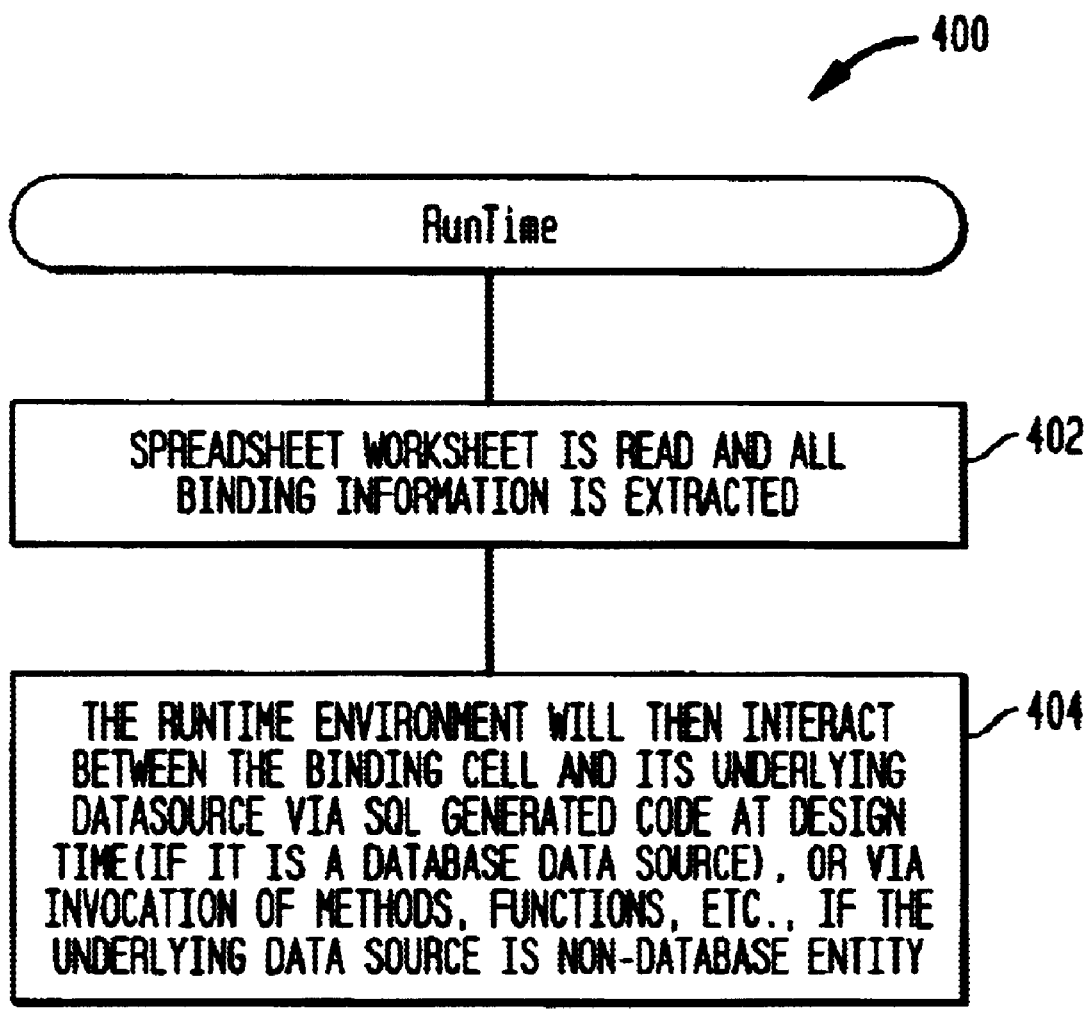
FIG. 5 is a flowchart of a process for binding data sources to cells.

A process 400 associated with the run-time environment is shown in FIG. 5. First, the spreadsheet worksheet is read and all binding information is extracted (step 402). Where the data source is a database, the binding information extracted from the worksheet includes:
1. Link Path Info (e.g. cellname.tableName.columnName)
2. The full path location of the data source (e.g. directory and/or URL location of the database)
3. Connection information (e.g. connection string)
4. SQL associated with the binding (e.g Update, Insert, Delete, Select)
5. Parameters associated with the SQL (e.g. in the statement: select column1 from table1 where column1=cell1*25, the parameter is considered to be column1 and its value is considered to be cell1*25 which is computed at runtime prior to actually executing the SQL statement.)
6. Max rows for fetching purposes Where the data source is a non-database, the binding information extracted from the worksheet includes:
1. Type of the data source (e.g. COM, DLL, EJB, CORBA, etc.)
2. Based on the type of data source specific information is stored (e.g. for COM objects, their Interface identifications are stored).
3. Link Path Info (e.g. cellname.objectname.methodname)
4. A list of parameters to the data source and how they are computed. This includes the type of the parameter whether it is input only or output only or input/output, in addition to how it is to be evaluated).

The runtime environment knows the type of data source the cell is bound to and processes the binding information accordingly. The run-time environment interacts with the binding cell and the data source using SQL code (step 404). The SQL code generation is done through a user friendly GUI wizard. The wizard will provide different types of SQL statements that can be generated by the wizard including Select, Insert, Update and Delete. The interactive process is as follows:
1. Wizard loads up the model information (e.g., tables, views, stored procedures, among others)
2. User selects a specific object displayed to him from the list. This includes for example a table along with its columns.
3. These selected objects will be included in the type of SQL statement to be generated.
4. User will then enter parameter criteria information (e.g. the terms that will go into the WHERE clause. This is done via selecting columns names from a list.)
5. Wizard displays the generated SQL to the user for possible manual adjustments; and,
6. Virtual object (in this case a virtual table) is created based on the generated SQL statement:

If the data source is not a database, such as a COM object, the process 400 will seamlessly, for example, create a CoCreateInstance in order to instantiate the COM object and then, by knowing the name of the method that was serialized within the worksheet for that particular cell, the process 400 invokes the appropriate method using COM (APIs). Similarly, if the data source is a Corba object or a Java Bean method, the process 400 would call the appropriate interface and mechanism in order to invoke the binding method.

Figure 6:
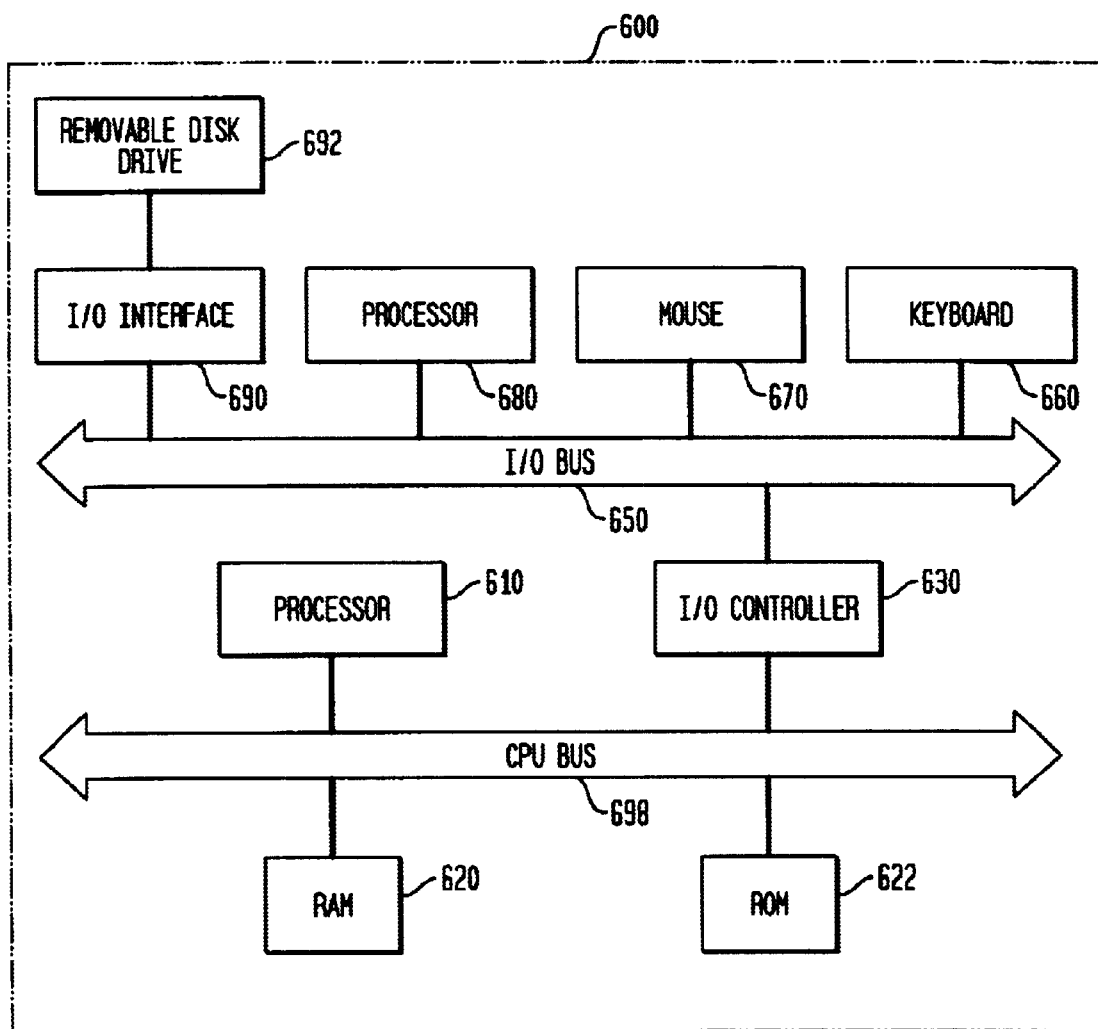
FIG. 6 is a schematic diagram of a computer for supporting automatic cell binding.

The invention may be implemented in digital hardware or computer software, or a combination of both. Preferably, the invention is implemented in a computer program executed in a computer system. Such a computer system may include a processor, a data storage system, at least one input device, and an output device. FIG. 6 illustrates one such computer system 600, including a processor (CPU) 610, a RAM 620, a ROM 622 and an I/O controller 630 coupled by a CPU bus 650. The I/O controller 630 is also coupled by an I/O bus 650 to input devices such as a keyboard 660, a mouse 670, and output devices such as a monitor 680. Additionally, one or more data storage devices 692 is connected to the I/O bus via an I/O interface 690.

Further, variations to the basic computer system of FIG. 6 are within the scope of the present invention. For example, instead of using a mouse as user input devices, a pressure-sensitive pen, digitizer or tablet may be used to generate the drawn segment location information. The user input is thus sampled to define the segment.

The above described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A method comprising the steps of:

importing a data object and defining a data source model for the data object;

associating the data object with one or more cells in a spreadsheet; and binding data from the data object to the one or more cells upon request, wherein binding is based on information from the data source and wherein the data is updated into and from the spreadsheet back to the data source based on changes to the spreadsheet.

2. The method of claim 1, wherein the importing step is performed during design time.

3. The method of claim 1, wherein the associating step is performed during design time.

4. The method of claim 1, wherein the binding step is performed during run time.

5. The method of claim 1, wherein the imported data object is stored in an Extended Mark-up Language (XML) format.

6. The method of claim 1, wherein the imported data object is stored in a tree.

7. The method of claim 1, wherein the associating step further comprises the step of dragging-and-dropping one or more children of the data object into one or more cells in the spreadsheet.

8. The method of claim 1, wherein the data source is a database.

9. The method of claim 8 comprising the step of generating SQL code during run-time.

10. The method of claim 1 wherein the data source is a business object.

11. The method of claim 10, further comprising the step of invoking a method or a function associated with the data source.

12. Computer software for binding data from a data source to one or more cells in a spreadsheet, the computer software residing on a computer-readable medium and comprising instructions for causing a computer to perform the following operations:

import a data object from different data sources and define a data source model for the data object;

associate the data object with the one or more cells in the spreadsheet; and bind data from the data object to the one or more cells upon request, wherein the data is updated into and from the spreadsheet back to the data source based on changes to the spreadsheet.

13. The computer software of claim 12, wherein the code import operation is performed during design time.

14. The computer software of claim 12, wherein the code associate operation is performed during design time.

15. The computer software of claim 12, wherein the bind operation is performed during run time.

16. The computer software of claim 12, wherein the code associate operation further comprises to drag-and-drop one or more children of the spreadsheet.

17. The computer software of claim 12, wherein the data source comprises a database.

18. The computer software of claim 12, wherein the data source is a business object.

19. A system for binding data from a data source to one or more cells in a spreadsheet, comprising:

means for importing a data object and defining a data source model for the data object;

means for associating the data object with the one or more cells in the spreadsheet; and means for binding data from the data object to the one or more cells upon request, wherein the data is updated into and from the spreadsheet back to the data source based on changes to the spreadsheet.

20. The system of claim 19, wherein the importing means and the associating means perform the respective importing and associating functions during design time.

21. A method comprising:

importing data objects from different data sources to define a data source model;

associating each data object with one or more cells in a spreadsheet; and binding data from the data objects to the one or more cells upon request, wherein the data is updated into and from the spreadsheet back to the data source based on changes to the spreadsheet.

* * * * *

UNITED STATES PATENT AND TRADEMARK OFFICE
CERTIFICATE OF CORRECTION

PATENT NO. : 6,631,497 B1
DATED : October 7, 2003
INVENTOR(S) : Ardeshir Jamshidi, Farzad Farahod and Hardeep Singh It is certified that error appears in the above-identified patent and that said Letters Patent is hereby corrected as shown below:

<u>Title page,</u>
Item [75], Inventors, "Farzad Farahod" should be spelled -- Farzad Farahbod --.

Signed and Sealed this

Sixth Day of July, 2004

JON W. DUDAS
*Acting Director of the United States Patent and Trademark Office*